United States Patent
Bunker et al.

(10) Patent No.: US 6,528,765 B2
(45) Date of Patent: Mar. 4, 2003

(54) ENGINE DRIVEN WELDER WITH FIELD CURRENT BOOST

(75) Inventors: Tom Bunker, Appleton, WI (US); John Leisner, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/025,010

(22) Filed: Dec. 19, 2001

(65) Prior Publication Data

US 2002/0053560 A1 May 9, 2002

Related U.S. Application Data

(63) Continuation of application No. 09/405,640, filed on Sep. 24, 1999, now Pat. No. 6,359,259.

(51) Int. Cl.[7] .................................................. B23K 9/10
(52) U.S. Cl. ................................... 219/133; 219/130.21
(58) Field of Search ........................... 219/133, 130.21, 219/130.31, 130.32, 130.33, 134, 137.71, 137 PS

(56) References Cited

U.S. PATENT DOCUMENTS

| | | | | |
|---|---|---|---|---|
| 3,581,052 A | * | 5/1971 | Milton ................... | 219/130.21 |
| 4,465,920 A | * | 8/1984 | Hoyt, Jr. et al. ............ | 219/133 |
| 4,904,841 A | * | 2/1990 | English ....................... | 219/133 |
| 5,734,147 A | * | 3/1998 | Bunker et al. .............. | 219/133 |
| 6,153,855 A | * | 11/2000 | Renner et al. .............. | 219/133 |

OTHER PUBLICATIONS

Miller® Owner's Manual S—32P8 And S—32P12 Dec. 1992.

Miller The Power of Blue Big Blue® 400D Owner's Manual Dec. 1998.

* cited by examiner

Primary Examiner—Clifford C. Shaw
(74) Attorney, Agent, or Firm—George R. Corrigan

(57) ABSTRACT

A method and apparatus for a generator driven CV welding power supply includes a generator driven by an engine, and a CV electronic field controller. The generator includes a field winding and a welding output winding. The electronic field controller is connected to the field winding and has an engine feedback input. The controller also has a voltage boost circuit responsive to the engine RPM (or engine speed command signal). A wire feeder includes a motor powered by the generator output, and the boosted field current helps start the wire feeder when the engine is idling. The speed of the engine is reduced when there is no welding arc.

17 Claims, 2 Drawing Sheets

ENGINE DRIVEN WELDER WITH FIELD CURRENT BOOST

CROSS-REFERENCE TO RELATED APPLICATION

This is a continuation of application Ser. No. 09/405,640, filed on Sep. 24, 1999. U.S. Pat. No. 6,359,259.

FIELD OF THE INVENTION

The present invention relates generally to the art of engine driven welders. More specifically, it relates to engine driven welders having an engine that idles when no welding is occurring, and that provide an OCV adequate for starting an arc and/or wire feeder.

BACKGROUND OF THE INVENTION

Engine driven welding power supplies are well known, and may be driven either by a DC generator or an AC generator (also called an alternator-rectifier). An AC generator generally includes, in addition to an alternator, a reactor followed by rectifiers to provide a DC output.

Often, the output is controlled in welding power supplies using feedback. For example, a field current control includes comparing field current to a set point, and adjusted the field current in response to deviations therefrom.

Another prior art design receives welding current and/or welding voltage feedback, and controls the field current to produce a desired output. U.S. Pat. No. 5,734,147, issued Mar. 31, 1998 to the assignee of the present invention, and entitled Method And Apparatus For Electronically Controlling The Output Of A Generator Driven Welding Power Supply, describes such a control, and is hereby incorporated by reference. Another example of a known engine driven welding power supply with field current control is the Miller Big Blue 400™. Such prior art engine driven power supplies can be operated to provide a CC or a CV output. The prior art engine-driven welding power supplies, and their field current controllers, generally perform well.

It is desirable to allow the engine to idle at a low engine speed during times when welding is not being performed. This saves fuel, reduces noise, and extends the life of the engine and reduces the OCV. However, idling is not done in the CV mode because such an engine-driven welding power supply is often operated with a wire feeder that uses the welding voltage to power the feeder motor, such as the Miller S-32P™ portable wire feeder. A low OCV does not provide sufficient power to reliably start such a wire feeder (i.e., provide enough voltage for the torque needed to start the electric motor in the wire feeder). Thus, to maintain the output voltage (OCV) at a high enough magnitude to reliably start the wire feeder, the engine is operated at a running rpm (not an idle rpm), even when welding is not being performed.

Accordingly, an engine driven welding power supply that idles when not welding is desirable. Preferably, such an engine driven welding power supply will provide an open circuit voltage sufficient to reliably start a wire feeder (i.e., have enough voltage for the torque needed to start the electric wire feed motor), and to reliably start the arc.

SUMMARY OF THE PRESENT INVENTION

According to a first aspect of the invention a generator driven welding power supply includes a generator driven by an engine, and an electronic field controller. The generator includes a field winding and a welding output winding. The electronic field controller is connected to the field winding and has an engine feedback input. The controller also has a voltage boost circuit that is responsive to the engine feedback input. The engine feedback input receives a signal representative of the engine speed.

The electronic field controller includes a CV controller, and the welding output winding is disposed to provide a welding voltage output in one embodiment.

An RPM sensor senses the RPM of the engine, and is connected to the engine feedback input, and the RPM sensor includes an idle sense circuit in various alternatives.

The engine includes a speed input and a welding output feedback circuit is disposed to provide an output feedback signal indicative of the presence or absence of a welding arc in another embodiment. An engine speed controller is connected to the engine speed input, which receives the output feedback signal.

A wire feeder is disposed to provide wire to an arc in yet another embodiment. The wire feeder includes a motor that feeds wire in response to a wire feed input power. The wire feeder receives the welding voltage output as the wire feeder input power, and provides power to the arc.

The apparatus voltage boost circuit increases the field current, and thus the magnitude of the welding voltage output is increased, in response to the engine speed being below a threshold in yet another alternative.

According to a second aspect of the invention a method of providing a welding power output includes running an engine, and driving a generator with the engine to produce an electrical output. A field current in a generator field winding is electronically controlled, thereby controlling the electrical output. The engine speed is sensed, and the field current is boosted when the engine speed drops below a threshold.

The speed of the engine is reduced when there is no welding arc in one embodiment. Wire is fed to the arc from a wire feeder, and power for the wire feeder comes from the electrical output in another embodiments The electronic field current control includes controlling the field current to provide a CV output in another alternative.

Sensing the engine speed includes sensing the RPM of the engine, and/or boosting the field current when the engine idles in various embodiments.

According to a third aspect of the invention, a generator driven welding power supply includes an engine and a generator connected to and driven by the engine. The generator includes a welding output winding disposed to provide power to a welding arc. A CV controller is connected to the welding output and the generator. A welding output feedback circuit provides an output feedback signal indicative of the presence or absence of a welding arc, and the engine idles in response to a feedback signal indicative of the absence of an arc.

According to a fourth aspect of the invention, a method of providing a welding power includes driving a generator with an engine and producing a welding output. The generator is controlled to provide a CV output and the presence or absence of a welding arc is sensed. The engine is caused to idle in the event the absence of the arc is sensed.

According to a fifth aspect of the invention, a method of providing a welding output includes a generator driven by an engine. The generator includes a field winding and a welding output winding. An electronic field controller is connected to the field winding, and has an arc feedback input and a voltage boost circuit responsive to the arc feedback input, The arc feedback input is disposed to receive a signal representative of a parameter of the arc.

The voltage boost circuit includes a circuit disposed to increase the field current in response to the arc feedback input indicating the arc current is less than a threshold and/or an arc sensor senses the presence or absence of the arc, and is connected to the arc feedback in other alternatives. The threshold may be is less than normal welding current.

According to a fifth aspect of the invention, a method of providing a welding power output includes running an engine and driving a generator with the engine to produce an electrical output. A field current in a generator field winding is electronically controlled to control the electrical output. The field current is boosted in response to a selected arc parameter.

The arc parameter is the presence or absence of the welding arc in one embodiment.

Other principal features and advantages of the invention will become apparent to those skilled in the art upon review of the following drawings, the detailed description and the appended claims.

Figure 1:
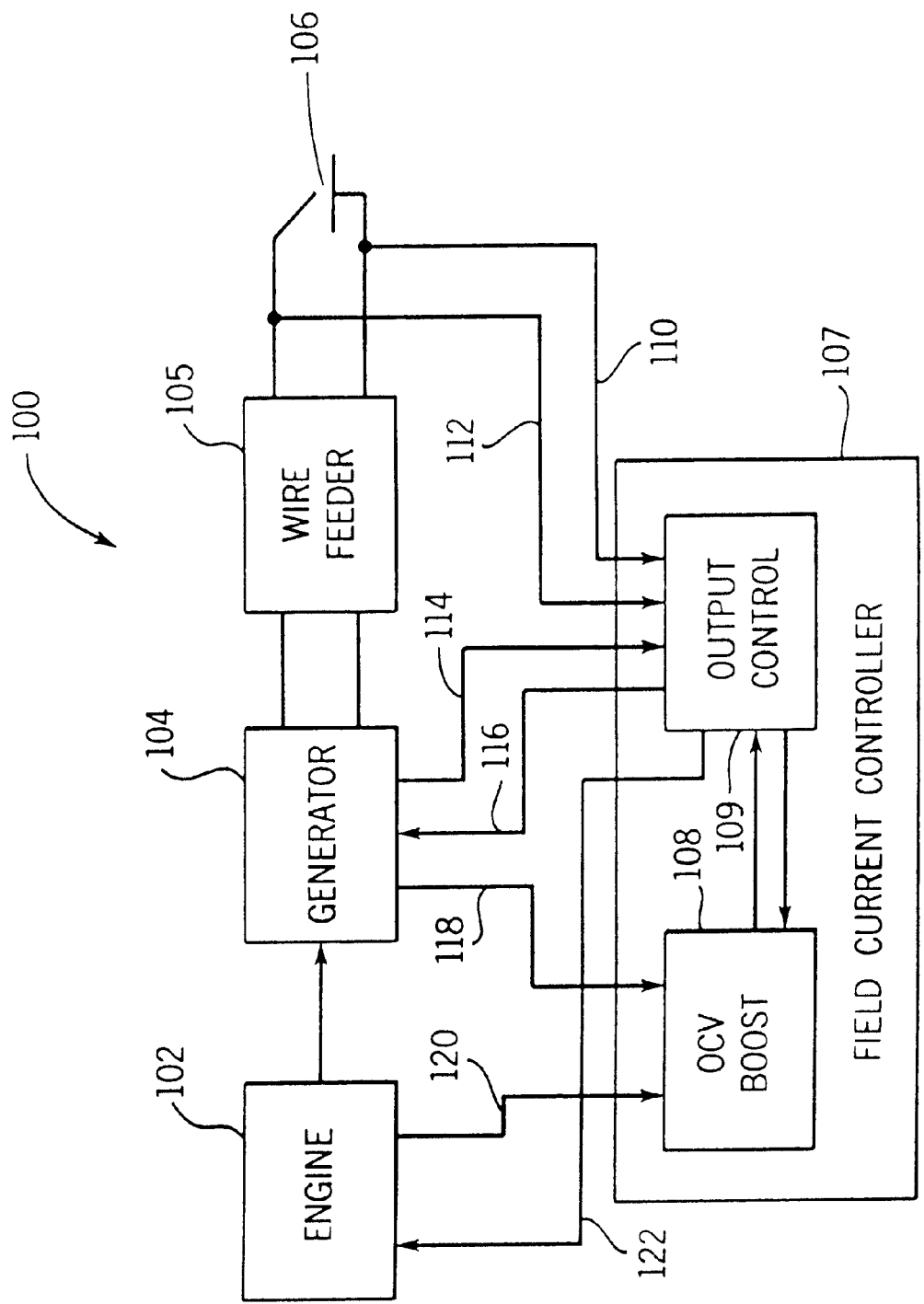
FIG. 1 is a block diagram of an engine-driven welding power supply constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to refer to like components.

DETAILED DESCRIPTION OF THE PREFERRED EMBODIMENTS

While the present invention will be illustrated with reference to a particular welding power supply, wire feeder, controller, and boost circuit, it should be understood at the outset that the invention can also be implemented with other components and circuitry.

The invention generally provides for causing an engine in an engine driven welding power supply operating in CV mode to idle when there is no welding output. Additionally, the open circuit voltage (OCV) is increased by increasing the field current when the engine is idling. The invention is implemented, in the preferred embodiment, using an engine driven welding power supply such as the Miller Big Blue 400™. The OCV boost may be implemented by adding components to the field controller of the Miller Big Blue 400™. The known power supply and field controller will not be described herein, but will generally be referred to in a block diagram, because they are known, and the invention is not dependent upon the specific field controller and welding power supply used to implement the invention. Nor must the field controller and power supply be understood in detail to understand invention. In alternative embodiments, the invention is implemented using the electronic field controller (a field current controller electronically controlled) disclosed in U.S. Pat. No. 5,734,147, or any other engine driven welding power supply.

An engine driven welding power supply 100 constructed in accordance with the present invention is shown in FIG. 1, and includes an engine 102, a generator 104, a wire feeder 105, and a field current controller 107., including an OCV boost 108 and an output control 109. These components cooperate to provide a welding output 106. Welding output, as used herein, refers to the output of the generator which is suitable for welding, or which would be suitable for welding after rectification, filtering, conversion, or other power manipulation. An auxiliary power output may also be provided.

Wire feeder 105 may include its own controller, and may be an integral part of, or packaged separately from, the power supply. A Miller S-32P™ portable wire feeder is used in a preferred embodiment. Wire feeder 105 receives as input power (i.e., power to drive the feeder) the output of generator 104, and a wire feed motor is thus driven by the weld output voltage. Power from generator 104 is also passed through wire feeder 105 (or bypasses it) and provided to arc 106.

Generator 104 includes a field winding and a welding or output winding (i.e., the winding on which the welding output is provide). Engine 102 drives generator 104 (causes it to rotate and produce voltage on its output winding). The output of generator 104 is provided on the welding output winding. The amount of power provided on the output winding is determined, in part, by the magnitude of the current through the field winding (the field current). The welding output is provided to welding arc 106 (after filtering and rectification).

Field current controller 107 controls the magnitude of the field current in field winding 104. Field current controller 107 may be a CC controller, or a CV controller, as is known in the art. Field current controller 107 includes arc or output feedback signals on lines 112 and 110 (which may also be located at the output of the generator). The arc (or output or welding output) feedback signals may be used to indicate current magnitude, voltage magnitude, or the absence or presence of current, or the rate of change of current and/or voltage. Feedback from generator 104 is provided on line 114, and may include signals indicative of field current (used for closed loop field current control), and exciter voltages which may be used to determine the generator or engine rpm.

Output controller 109 is, in the preferred embodiment, a controller that operates (or is operable in) a CV mode. Such a controller may be found in the Miller Big Blue 400™ Engine Driven Welding Power Supply. An alternative controller is described in U.S. Pat. No. 5,734,147. The CV controller, in the preferred embodiment, monitors the output voltage (welding voltage), and adjusts a field current command in response to the differences between the sensed output voltage and the desired output voltage. A CV controller, as used herein, is a controller that causes the output to be constant voltage, substantially constant voltage, or a desired voltage slope, and includes both open and closed loop controls. A welding output feedback circuit includes lines 112 and 110 and other circuitry (current sensor, filters, buffers, amplifiers, comparators, etc.), and provides output feedback to controller 107 to control the welding output.

Output controller 109 senses, on arc feedback input lines 112 and 110 for example, a parameter of the arc (an arc feedback signal), such as whether or not a welding arc is present. The presence or absence an arc may be detected in a number of ways, such as whether welding current is less than a threshold, or whether arc voltage is greater than a threshold. If the welding arc is not present, then output controller 109 provides an idle signal on line 122 to an engine speed input on engine 102, or to an engine speed controller. The engine speed input or engine speed controller may include a throttle, governor, or other electrical or mechanical device to control engine speed. The specific type of engine speed control is not important for this invention. Thus, engine 102 suffers less wear and tear, and is less noisy and more fuel efficient, because it idles when welding is not occurring.

However, and when engine 102 idles it would normally causes the open circuit voltage to droop, or be low and thus fail to reliably start wire feeder 105. Accordingly, the present invention provides that the OCV is boosted to reliably start wire feeder 105 and/or start the arc.

Feedback is provided from generator 104 and/or engine 102 on engine feedback input lines 118 and 120 to OCV boost circuit 108. The feedback on lines 118 and/or 120 indicate an engine/generator parameter such as engine and/or generator speed (or rpm), or a control input to the engine, such as an idle or speed command. The signal from generator 104 is indicative of engine speed if it senses the frequency or period of the ac generated waveform, because the frequency and period of the generated waveform is dependent upon engine speed. A signal is representative of the engine speed, as used herein, if it directly or indirectly depends on or controls engine speed (such as an rpm signal, idle command, or feedback in response to which an which idle command is given) engine speed.

OCV boost circuit 108 includes an idle sense circuit that compares the sensed rpm to a threshold, and if the rpm is less than the threshold (the threshold preferably is between idle speed and normal operating speed) then the OCV is boosted. Idle sense circuit, as used herein, is a circuit that determines if the engine is idling, or operating at a speed below a threshold. The idle circuit, in the preferred embodiment, determines if the engine is idling using rpm sensing. Thus, the idle sense circuit, along with the feedback signals, form an RPM sensor.

OCV boost circuit 108 boosts the OCV by increasing the CV field current command provided by output controller 109. The specific circuitry used to boost the OCV will be described below, but any voltage boost circuit may be used. Voltage boost circuit, as used herein, includes any circuit which increases the output voltage in response to a selected condition (such as idling). An alternative embodiment provides that the OCV boost is provided in response to the controller sensing that welding is not taking place, using the arc feedback. The OCV is boosted in response to this determination. Also, the engine may be caused to idle in response to this determination.

Figure 2:
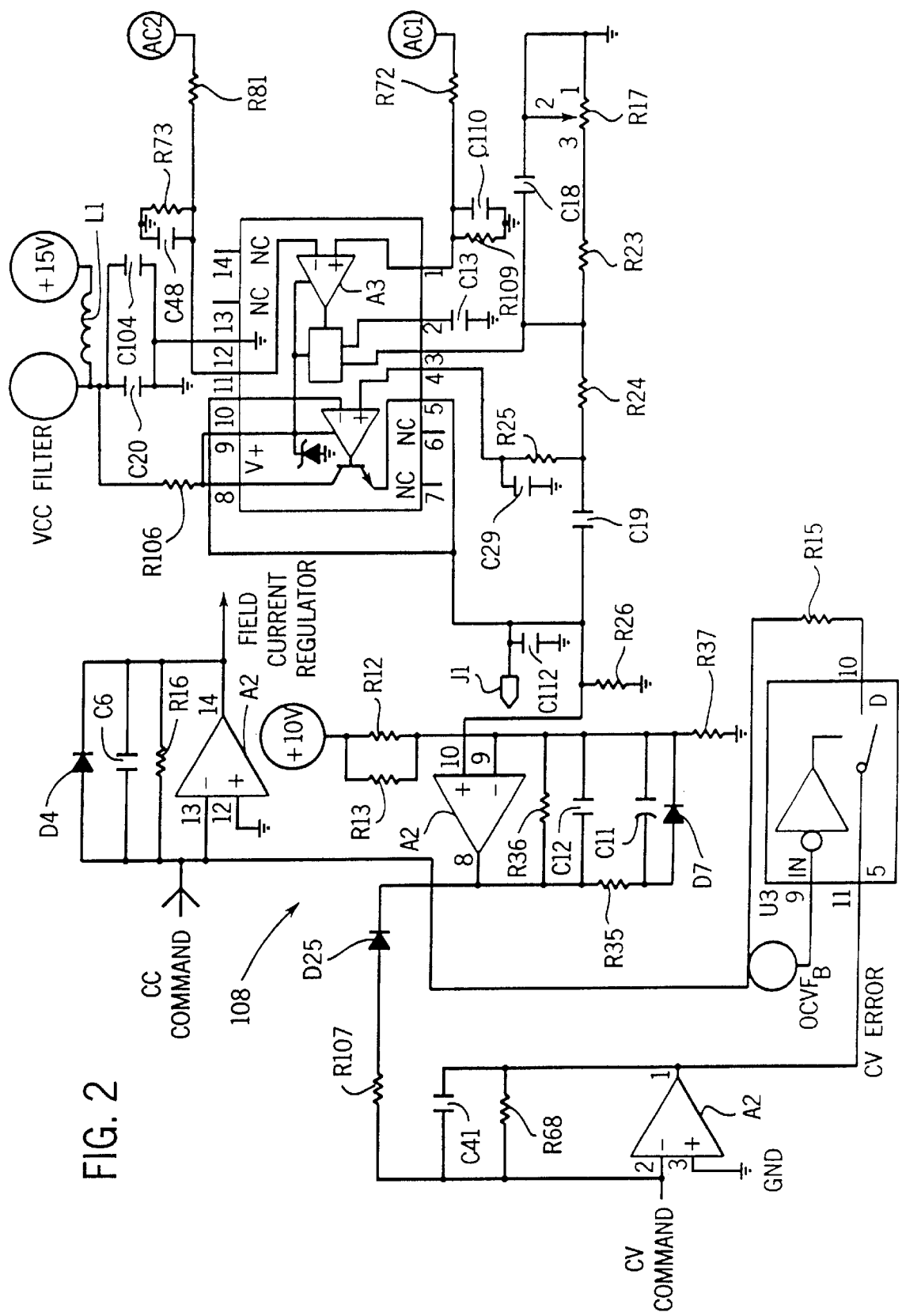
FIG. 2 is a circuit diagram of part of a field controller in accordance with the present invention.

A schematic of one implementation of OCV boost circuit 108 is shown in FIG. 2. Generally, OCV boost circuit 108 receives the ac output of generator 104. It detects the frequency of the ac signal, thus detecting the rpm of engine 102. The rpm is compared to a threshold, and if it is below a threshold, OCV boost circuit 108 increases the CV current command (created by output controller 109).

The ac exciter voltage from generator 104 is provided (after filtering etc.) on AC1 and AC2 to voltage dividers including resistors R73 (10.0 Kohms), R81 (1.00 M ohms), and capacitor C48 (0.47 $\mu$F), and resistors R109 (10.0 Kohms) and R72 (1.00 Mohms), and capacitor C110 (0.47 $\mu$F) to an IC op amp A3 (LM2917 M). IC A3, and associated circuitry (filters, scaling, etc) including capacitors C20 (0.47 $\mu$f), C104 (0.47 $\mu$f), C13 (0.1 $\mu$f), C29 (0.47 $\mu$f), C18 (0.22 $\mu$f), C19 (0.1 $\mu$f) and C112 (0.1 $\mu$f), and resistors R106 (470 ohms), R23 (110 Kohms), R17 (up to 50 Kohms), R24 (121 Kohms) and R25 (121 Kohms)and inductor L1 (1000 $\mu$H), detects zero crossing of the signals on AC1 and AC2, and outputs a voltage responsive to the frequency of zero crossings. Thus, IC A3 and its associated circuitry provide a signal indicative of the engine speed or rpm.

Resistor R17 is a potentiometer and used to calibrate the circuit. Test point R1 on a connector J1 is, in the preferred embodiment, at 6 volts when the circuit is properly calibrated.

The rpm signal is provided from IC A3 to an op amp A2 (pin 10). Op amp A2, along with associated circuitry including resistors R26 (10.0 Kohms), R37 (56.2 Kohms) R35 (301 Kohms), R36 (2.2 Mohms), R12 (41.2 Kohms), and R13 (267 Kohms), capacitors C12 (220 pF) and C11 (1 $\mu$F), and a diode D7, is configured as a comparator. The resistors, along with a 10V supply, set the threshold below which an OCV boost is provided. When the rpm signal from IC A3 is below the threshold, comparator A2 (pin 8) is low. When the rpm signal from IC A3 is above the threshold, comparator A2 (pin 8) is high.

The output of comparator A2 is provided through a diode D25 and a resistor R107 (39.2 Kohms) to an op amp A2 (pin 2). When the output of comparator A2 (pin 8) is high (idle not detected), diode D25 blocks the signal. When the output of comparator A2 (pin 8) is low (idle detected), diode D25 passes the signal.

Op amp A2 (pins 1,2,3) is the CV regulator (such as in the prior art), includes associated resistor R68 (15.0 Kohms) and capacitor C41 (0.22 $\mu$F), and provides the CV ERROR used in normal CV operation and is part of output controller 109 in the preferred embodiment. The CV COMMAND signal received on pin 2 of CV regulator A2 is the command for normal (not idle) conditions. CV COMMAND is subtracted from CV FEEDBACK to provide CV ERROR. When idle is detected, and pin 8 of comparator A2 is low, the output of CV regulator op amp A2 (pin 1) is pulled higher, thus boosting the CV ERROR.

The output of CV regulator A2 pin 1 sends the boost signal through a switch U3 (pin 10) and a resistor R15 (100 Kohms) to a field current regulator op amp A2 pin 13. Switch U3 is closed for CV operation.

Field current regulator A2 is part of the normal field current control (such as in the prior art),and is part of output controller 109. Circuitry associated with field current regulator A2 includes a diode D4, a capacitor C6 (4700 $\mu$F), and a resistor R16 (1 Mohms). When operating in the CV mode the CV ERROR is provided to field regulator A2 pin 13. When operating in the CC mode, a CC command is provided to field current regulator A2 pin 13. Alternative embodiments include other circuitry, including the regulator in boost circuit 108, and using microprocessor control, Numerous modifications may be made to the present invention which still fall within the intended scope hereof. Thus, it should be apparent that there has been provided in accordance with the present invention a method and apparatus for welding with an engine driven welder that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A generator driven arc welding power supply for providing a welding output comprising:

a generator driven by an engine, the generator including a field winding and a welding output winding; and an electronic field controller connected to the field winding, and having an Arc feedback input, and further having a voltage boost circuit responsive to the arc feedback input;

wherein the arc feedback input is disposed to receive a signal representative of a parameter of the arc.

2. The apparatus of claim 1, wherein the electronic field controller includes a CV controller, and the welding output winding is disposed to provide a welding voltage output.

3. The apparatus of claim 2, further comprising a wire feeder, disposed to provide wire to an arc, wherein the wire feeder includes a motor that feeds wire in response to a wire feed input power, wherein the wire feeder is disposed to receive the welding voltage output as the wire feeder input power, and wherein the welding windings are further disposed to provide power to the arc.

4. The apparatus of claim 1, wherein the arc feedback input is further disposed to sense the presence or absence of the arc.

5. The apparatus of claim 1, wherein the voltage boost circuit includes a circuit disposed to increase the field current, whereby a magnitude of the welding voltage output is increased, in response to the arc feedback input indicating the arc current is less than a threshold.

6. The apparatus of claim 5, further including an arc sensor, disposed to sense the presence or absence of the arc, and connected to the arc feedback.

7. The apparatus of claim 5, wherein the threshold is less than normal welding current.

8. A generator driven welding power supply for providing a welding output to an arc comprising:

a generator means for providing electrical power, wherein the generator means is driven by an engine, and wherein the generator means includes a field winding and a welding output winding, wherein the welding output winding is disposed to provide a welding output voltage to the arc; and an electronic field controller means for controlling a field current in the field winding, and having a voltage boost means for boosting a magnitude of the welding output voltage provided in response to arc feedback;

arc feedback means for providing a signal representative of an arc parameter to the voltage boost means.

9. The apparatus of claim 8, wherein the electronic field controller means includes a CV controller means for providing a CV output as the welding output voltage.

10. The apparatus of claim 8, wherein the arc feedback means includes a sensor means for sensing the presence or absence of the arc.

11. The apparatus of claim 8, wherein boost means includes an arc sense means for sensing when the arc current is less than a threshold.

12. The apparatus of claim 8, wherein the engine includes a speed input means for controlling the speed of the engine, and the apparatus further comprises welding output feedback means for providing an output feedback signal indicative of the presence or absence of the welding arc, and connected to the engine speed input means.

13. A method of providing a welding power output, comprising:

running an engine;

driving a generator with the engine, to produce an electrical output;

electronically controlling a field current in a generator field winding, thereby controlling the electrical output;

boosting the field current in response to a selected arc parameter.

14. The method of claim 13, wherein the arc parameter is the presence or absence of the welding arc, and reducing the speed of the engine in response to sensing the absence of the welding arc.

15. The method of claim 14, wherein electronically controlling a field current includes controlling the field current to provide a CV output.

16. The method of claim 14, wherein sensing the presence or absence of the arc includes comparing the arc current to a threshold.

17. The method of claim 16, further comprising feeding wire to an arc and deriving power for the wire feeder from the electrical output.

* * * * *